June 12, 1934.     E. G. SIMPSON ET AL     1,962,789
SEAT ADJUSTER
Filed Dec. 10, 1931     4 Sheets-Sheet 1
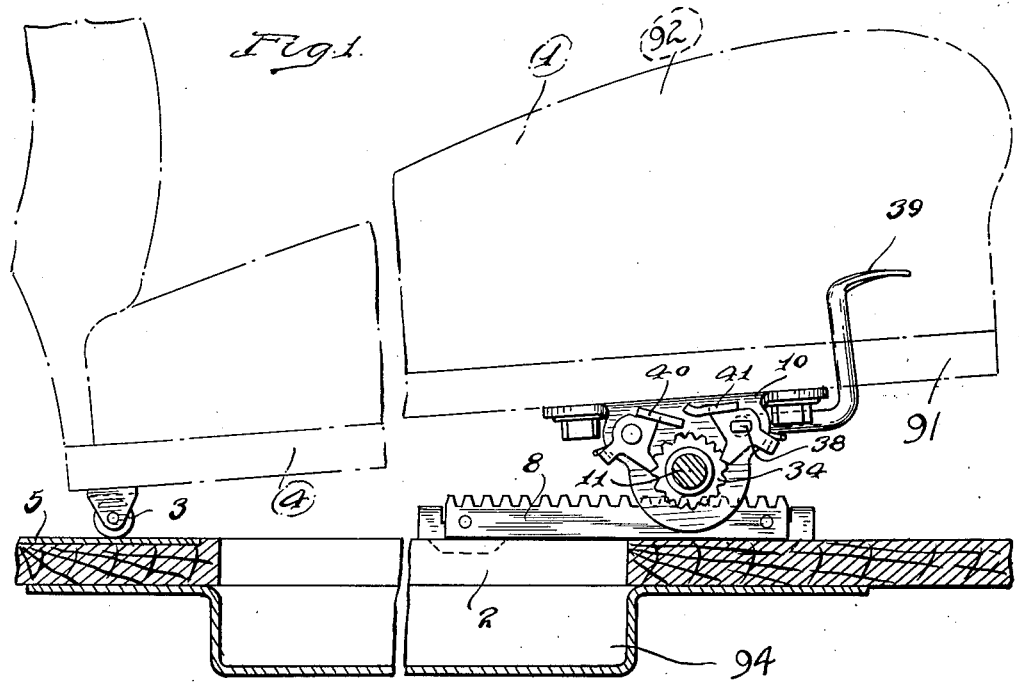
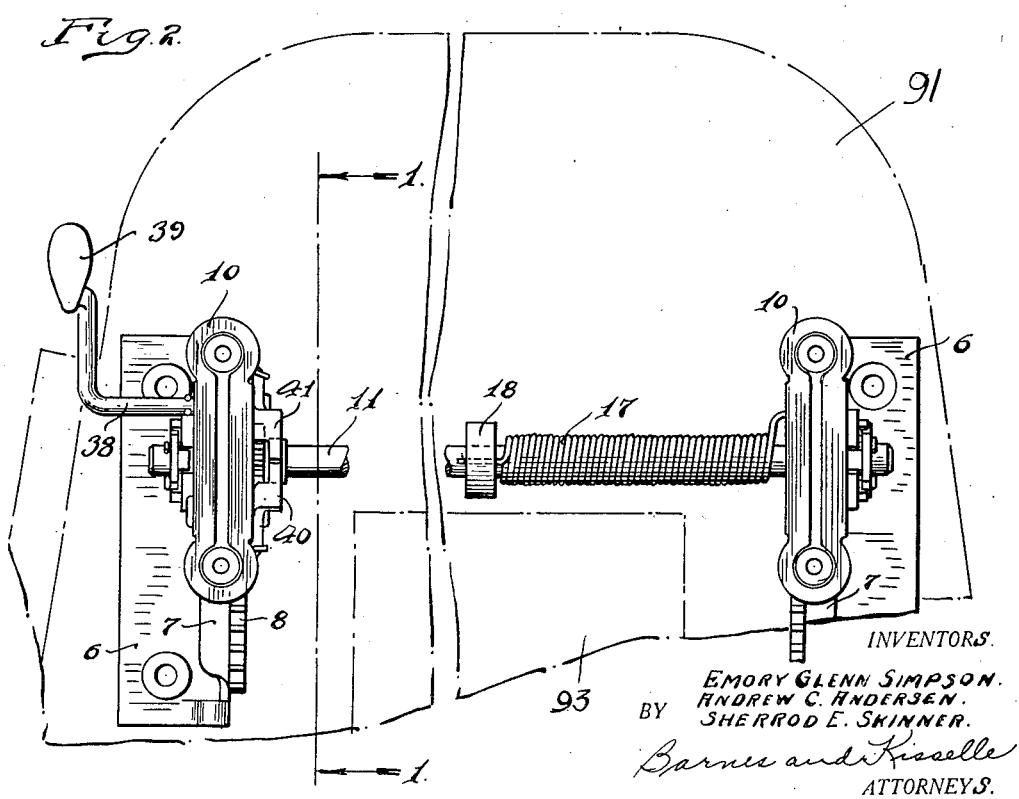
INVENTORS.
EMORY GLENN SIMPSON.
ANDREW C. ANDERSEN.
SHERROD E. SKINNER.
BY Barnes and Kisselle
ATTORNEYS.

June 12, 1934.  E. G. SIMPSON ET AL  1,962,789
SEAT ADJUSTER
Filed Dec. 10, 1931  4 Sheets-Sheet 2
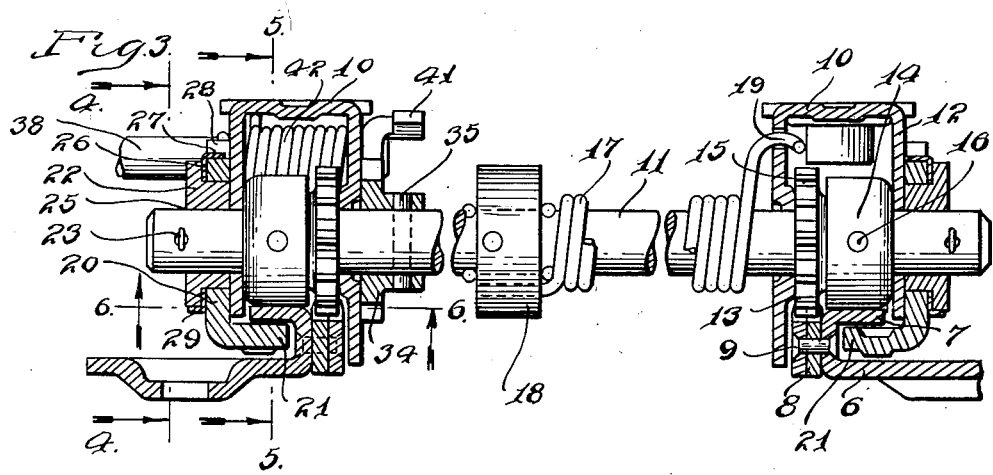
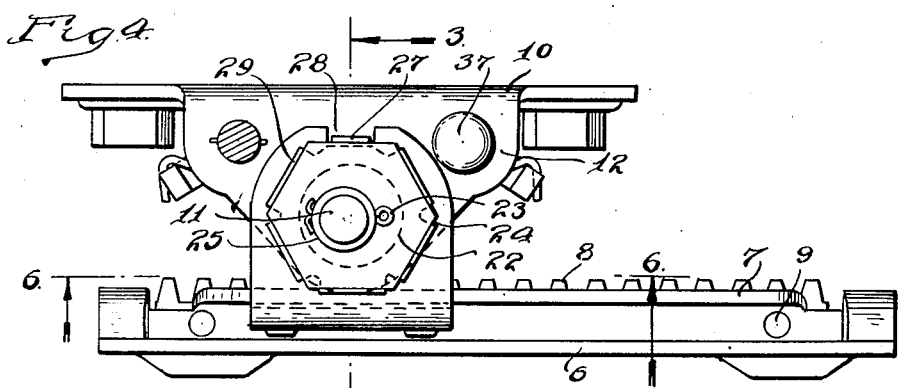
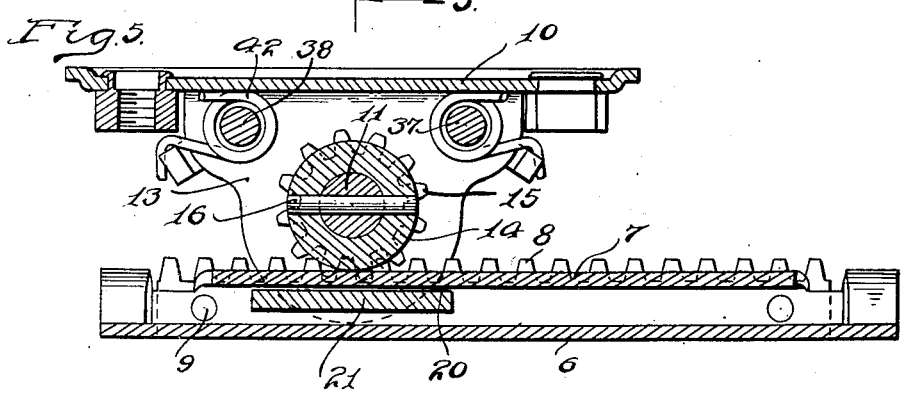
INVENTORS.
EMORY GLENN SIMPSON.
ANDREW C. ANDERSEN.
BY SHERROD E. SKINNER.
Barnes and Kisselle
ATTORNEYS.

June 12, 1934.  E. G. SIMPSON ET AL  1,962,789
SEAT ADJUSTER
Filed Dec. 10, 1931   4 Sheets-Sheet 3
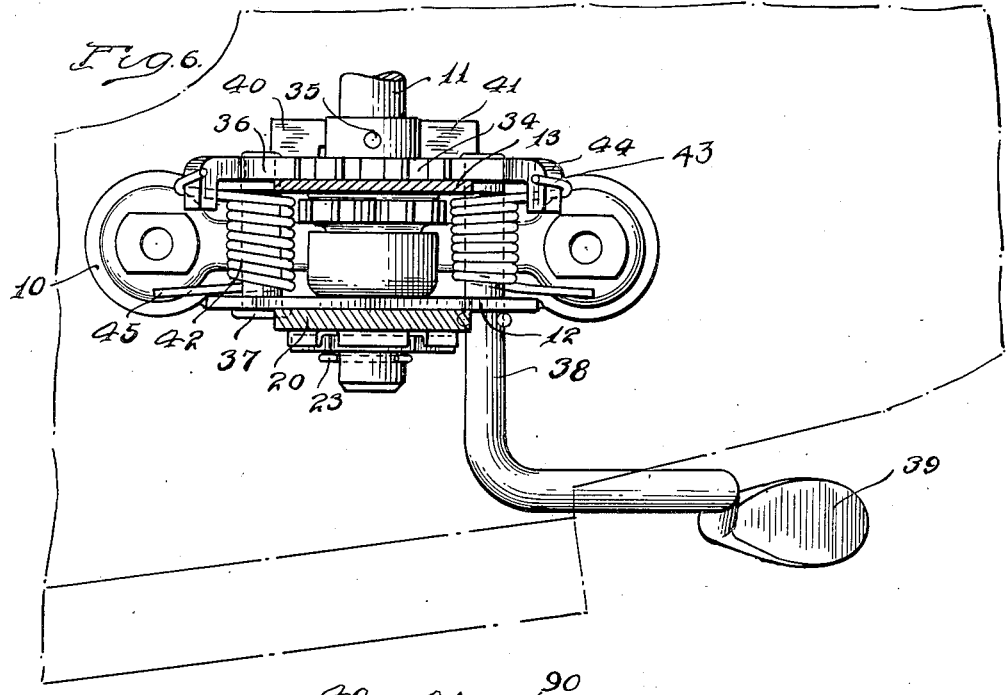
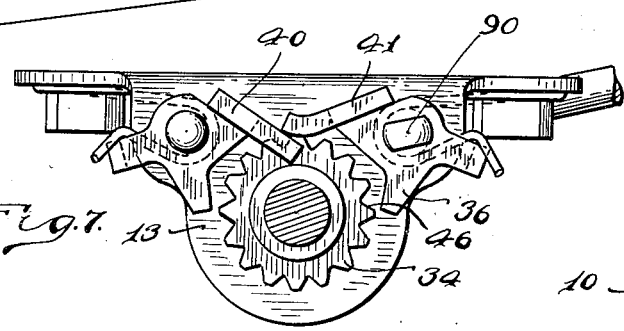
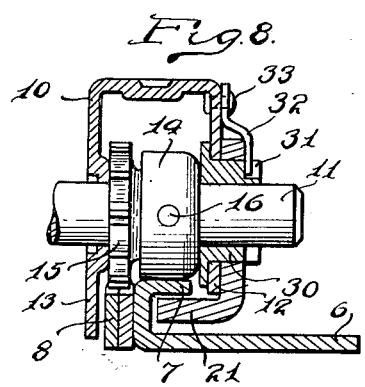
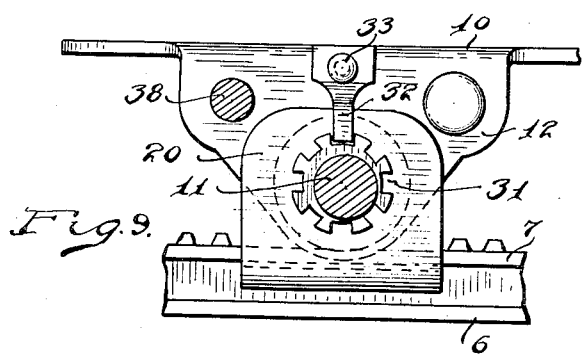
INVENTORS.
EMORY GLENN SIMPSON.
ANDREW C. ANDERSEN.
BY SHERROD E. SKINNER.
Barnes and Kisselle
ATTORNEYS.

June 12, 1934. E. G. SIMPSON ET AL 1,962,789
SEAT ADJUSTER
Filed Dec. 10, 1931 4 Sheets-Sheet 4
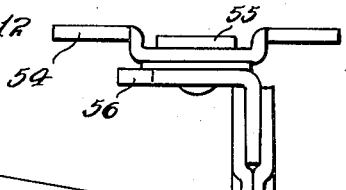
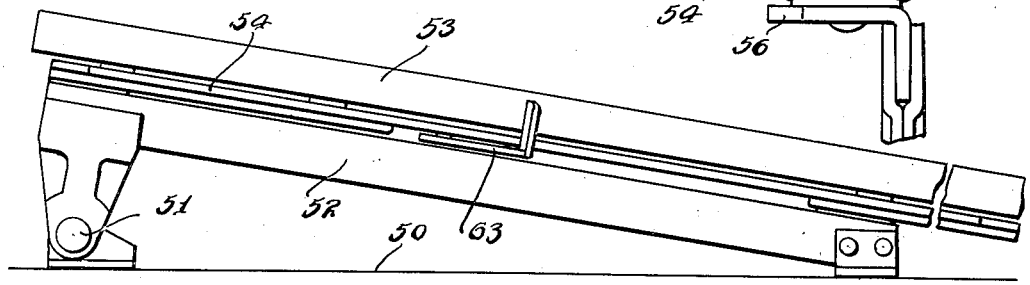
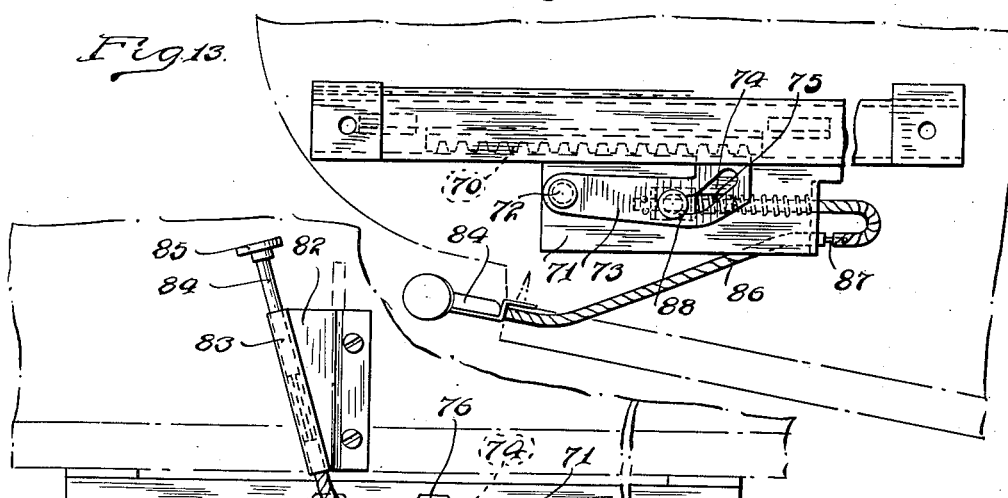

Patented June 12, 1934

1,962,789

UNITED STATES PATENT OFFICE 1,962,789

SEAT ADJUSTER

Emory Glenn Simpson, Andrew C. Andersen, and Sherrod E. Skinner, Detroit, Mich., assignors to Ternstedt Manufacturing Company, Detroit, Mich., a corporation of Michigan Application December 10, 1931, Serial No. 580,054

4 Claims. (Cl. 155—14)

This invention relates to a seat adjuster and more particularly to a seat adjuster for an automotive vehicle seat. It is an object of this invention to produce a seat adjuster that will adjust the seat backwardly and forwardly without cocking and this is achieved by the use of spaced parallel racks which cooperate with a pair of gears carried by a shaft rotatably mounted on the seat.

It is an object of this invention to produce a seat adjuster which is assisted in its forward movement by a coil spring which serves also as an anti-rattler between the parts of the adjuster.

It is an object of this invention to produce a seat adjuster that will positively lock the seat in its adjusted position and hold it in this position both when the vehicle is set in motion or stopped with a high acceleration and deceleration.

It is an object of this invention to produce a seat adjuster of the roller and track type in which the rollers and tracks are held in a nice rattle-proof engagement by easily adjusted tie-down brackets.

In the drawings:

Fig. 1 is a sectional view along the line 1—1 of Fig. 2.

Fig. 2 is a plan view of the adjusting mechanism showing the seat in dotted lines.

Fig. 3 is a section along the line 3—3 of Fig. 4.

Fig. 4 is a section along the line 4—4 of Fig. 3.

Fig. 5 is a section along the line 5—5 of Fig. 3.

Fig. 6 is a section along the line 6—6 of Fig. 4.

Fig. 7 is a detail of the dogging mechanism.

Fig. 8 is a sectional view through a modified mechanism for adjusting the tie-down bracket.

Fig. 9 is a fragmentary end view of the adjusting mechanism also showing the modified mechanism for adjusting the tie-down bracket.

Fig. 10 is a side elevation of a modified form of the seat adjuster.

Fig. 11 is a plan view of the modified form of the seat adjuster also showing a modified form of the dogging mechanism.

Fig. 12 is a detail of the modified form of adjuster along the line 12—12 of Fig. 11.

Fig. 13 is a top plan view of another modified form of dogging device.

Fig. 14 is a side elevation of the dogging device shown in Fig. 13.

Referring more particularly to the drawings, the seat adjuster is shown for descriptive purposes applied to an automobile seat 1 which is mounted for adjustment back and forth upon the floor 2 of the vehicle body. The seat adjuster is adapted to support the front of the seat and the rear of the seat is supported in any suitable way such as by the spaced rollers 3 carried by the seat bottom 4 which ride back and forth upon the track 5.

A pair of spaced parallel track members 6 having the track portion 7 are fixed to the floor 2. Each of the track members supports a rack 8. As shown the rack members 8 are riveted as at 9 to the track members.

The seat bottom 4 has fixed to the underside thereof a pair of spaced shaft supporting brackets 10. The bracket 10 has the depending ear portions 12 and 13 which have suitable opposed openings for rotatably supporting the shaft 11. The shaft 11 at each end has fixed thereon a roller 14 and a gear 15. As shown, the roller and gear 14 and 15 are positioned between the depending ears 12 and 13 of the bracket 10 and pinned to the shaft 11 by the pin 16. The rollers 14 are adapted to roll back and forth upon the track 7 and the gears 15 mesh with the teeth of the racks 8. Therefore as the seat is adjusted back and forth the engagement between the racks and the gears require the seat to move back and forth uniformly upon its track without cocking and binding between the parts of the adjuster.

It is readily appreciated that one can easily move an adjustable vehicle seat backwardly by flexing his legs whereas the seat is moved forward with difficulty owing to the difference in strength of the leg muscles used in the forward and backward motion. Hence, it is desirable to assist the individual in moving the seat forwardly. To this end the shaft 11 has mounted thereupon the coil spring 17, one end of which is fixed in the sleeve 18. The sleeve 18 in turn is pinned to the shaft 11. The other end of the coil spring 17 is hooked into the depending ear 13 of the bracket 10 as at 19. Hence, when the seat is moved backwardly the coil spring 17 is wound up whereas as the seat moves forwardly the coil spring 17 unwinds and the torque transmitted through the shaft, gear 15, and the fixed rack 8 to force the seat forwardly and thereby assist the individual in moving the seat forwardly. The spring is so arranged that when the seat is at the limit of its forward adjustment it will be under a slight tension. Hence, whatever the position of adjustment of the seat, the coil spring 17 at all times takes up any play or lost motion between the gear teeth and the rack teeth and thus serves as an anti-rattler.

It is evident that for practical reasons the seat must be tied to the floor of the vehicle, hence, to this end, the shaft 11 supports the tie-down bracket 20 having the inwardly turned end 21 which slidably engages the underside of the track 7. It is desirable to prevent any up and down relative movement between the rollers 14 and the track 7 to prevent rattling and yet the rollers should not be held so tightly to the tracks that they will bind or cause undue friction between the shaft and the shaft supporting brackets 10. Therefore, the tie-down bracket 20 has journaled therein and is supported thereby the eccentric cam member 22 which in turn is rotatably mounted upon the shaft 11 and held thereon by the cotter key 23. The member 22 has the hexagonal flange 24 (Fig. 4) and also has an eccentric opening 25 for rotatably receiving the shaft 11. It is evident that by rotating the member 22 about the shaft 11 that the tie-down bracket 20 and particularly the track engaging portion 21 can be adjusted toward and away from the track 7 to slidably engage the underside of the track 7 with whatever degree of tightness is desired. Preferably the engagement between the tie-down bracket 20 and the underside of the track 7 is sufficiently tight so that the roller 14 will roll easily upon the track 7 and yet will not jump up and down upon the same to cause chattering and rattling.

After the tie-down bracket 20 has been properly adjusted by the cam member 22 it is desirable to fix the cam member 22 against movement to insure this adjustment. To this end a thin plate of sheet metal 26 is mounted between the flange 24 and the cam 22 and the tie-down bracket 20 and is provided with the projecting lugs one of which is bent inwardly as at 27 to engage the slot 28 in the upper end of the tie-down bracket and another of which is bent outwardly as at 29 over a flat edge of the hexagonal flange 24 thereby preventing relative movement between the bracket 20 and the cam 22.

A modified form of the cam adjusting device for the tie-down bracket is shown in Figs. 8 and 9. In this instance the cam member 30 is provided with a plurality of peripheral notches 31. A flat spring 32 has one end riveted to the bracket 10 as at 33 and the free end adapted to engage in any one of the notches 31. Hence, to adjust the tie-down bracket 20 relative to the track 7 the flat spring 32 is disengaged from the notch 31 and the cam member 30 rotated eccentrically about the shaft 11 to properly adjust the bracket 20 whereupon the flat spring 32 is permitted to engage in which ever of the notches 31 which at this time is opposite the said spring to thereby lock the cam member 30 against rotation.

To prevent movement of the rollers and associated seat along the track when the vehicle is quickly accelerated or decelerated as in starting and stopping the vehicle, the adjusting mechanism is provided with a latch. This latch takes the form of a circular ratchet 34 which is fixed to the shaft 11 by the pin 35 and the dogs 36 which are pivotally supported on one of the brackets 10. One of the dogs 36 is mounted upon the shaft 37 journaled in the bracket 10 and the other dog is fixed upon the shaft 38 journaled in the bracket, which shaft has the finger portion 39. The one dog is provided with the offset lug 40 and the other with the offset lug 41 which overlaps the offset lug 40, consequently when the finger member 39 is raised from the position shown in Fig. 1, the overlapping lug 41 of the one dog through the lug 40 will cause simultaneous actuation of the said dogs. Each of the dogs are held in yieldable engagement with the ratchet member 34 by the coil springs 42, each of which has one end 43 hooked around a projecting lug 44 of the dog and the other end 45 engaged beneath the bracket 10. The dog-engaging surface 46 of each of the ratchet teeth is struck from such a radius that when the dog 36 is in engagement with the surface 46 of the ratchet tooth the torque transmitted by the shaft 11 to the ratchet 34 will cause the face 46 to cam the dog 36 inwardly toward the shaft 11 and therefore into a tighter dogging relation with the ratchet 34, making an effective over center lock, i. e., the face 46 is so designed that a line normal to said face will fall to the left of the center of rotation 90 of the dog 36.

In Figs. 10, 11 and 12 there is shown a modified form of the coil spring mounting and dogging mechanism. In this form the floor 50 of the vehicle body has pivotally mounted thereon as at 51 the frame 52. The seat bottom 53 has fixed thereto the slotted plates 54. The frame 52 carries the headed lugs 55 adapted to slidably engage the slots of the plate 54 to slidably secure the seat to the pivoted frame 52. The frame 52 is angle-shaped and the inner edge is toothed to form the rack 56.

The plate 54 is provided with a portion extending downwardly and then outwardly to form a support 57 upon which a gear 58 is rotatably mounted as at 59. The gear 58 meshes with the rack 56 through a slot in plate 57 and is counter-balanced by a coil spring having one end 60 hooked about a lug 61 of the support 57 and the other end 61 is fixed to the shaft 59 to which the gear 58 is keyed and thereby rotatably mounted upon the support 57.

The frame 54 has pivotally mounted thereon as at 62 the lever 63 which has a cam slot 64. The frame also has pivotally mounted thereon as at 65 the dog 66 provided with a plurality of teeth 67 which interengage with the rack 56 to lock the seat in its adjusted position. The dog 66 carries a stud 68 which engages in the cam slot 64. The dog 66 is held in engagement with the rack by the spring 69 which is looped about the pivot 62 and has one end hooked about the lever 63. Since the spring 69 presses the lever 63 in a counter-clockwise direction, the cam slot 64 acting through the stud 68 yieldably cams the dog 66 into engagement with the rack 56.

In this form of seat adjuster, as the seat is moved backwardly upon the release of the dog 66, the gear 58 is rotated by the rack 56 and the convolute spring is wound up. The convolute spring serves not only to keep the gear teeth and the dogging teeth in a tight rattle-proof engagement with the rack, but also, upon the release of the dog, assists in the forward movement of the seat.

In Figs. 13 and 14 there is shown another form of the dogging device. In this modified form the pivotally fixed seat support frame is provided with the rack 70 and the seat has fixed thereto the support plate 71. The support plate 71 has pivotally mounted thereon as at 72 the dog 73 which is provided with the cam slot 74. The support plate 71 is provided with the longitudinal slot 75. A headed stud 76 is slidably mounted in the cam slot 74 and the longitudinal slot 75 and is provided with the downwardly projecting legs 77. The plate 71 has a downwardly projecting flange 78. The flange 78 is perforated and provided with an opening which cooperates with a pair of openings in the legs 77 to slidably support the plunger 79. The plunger 79 is provided on one side of the yoke 77 with a key 80 and a coil spring 81 is carried by the plunger 79 between the yoke 77 and the flange 78. The seat also has fixed thereto the plate 82 which has a sleeve 83 inclined somewhat from the vertical for slidably receiving a plunger 84 provided with the push button 85. The plunger 84 is connected to the plunger 79 by the cable 86 which passes through an opening in the flange 78 and is fixed to the plunger 79 as at 87.

To operate this type of dogging device the plunger 84 is pressed downwardly which causes the plunger 79 to move to the right compressing the spring 81 and the headed stud 76 to move to the right, which, through its engagement with the cam slot 74, releases the dog from the rack 70. When the plunger 84 is released the spring 81 expands and causes the headed stud 76, through its engagement with the inner cam face of the cam slot 74, to cam the dog into dogging relation with the rack. It will be noted that the cam slot is provided with a portion 88 which coincides with the longitudinal slot 75 in the plate 71. Since the sides of the slot portion 88 are parallel to those of slot 75 and not inclined therefore the dog 73 will be positively locked into engagement with the rack since the portion 88 of the cam slot 74 cannot effect a camming action upon the stud 76 and therefore the dog cannot pivot about the pivot 72.

Since it is an object of this invention to produce a seat adjuster of the type which is adapted to be so mounted upon the underside of the seat that the tool box positioned beneath the seat is readily accessible, to this end the support brackets 10 are mounted to the seat frame 91 adjacent the front edge. The seat frame 91 is preferably the usual type having a rectangular opening 93 and is adapted to support the seat cushion 92. When the seat cushion 92 is removed from the seat frame 91 as shown in Figure 2, the tools in the tool box 94 are readily accessible through the opening 93 in the seat frame 91. It will be noted that the shaft 11 is positioned forwardly of the opening 93 in the seat frame, hence the seat adjuster in nowise interferes with the opening 93 and consequently upon removal of the cushion 92 the tools in the tool box 94 are always readily accessible.

We claim:—

1. In a seat adjuster adapted for an automotive vehicle of the type having a track and a roller adapted to roll up on the track, a tie-down bracket operatively connected to the roller and track for effecting a nice rolling engagement between the roller and the track and preventing movement of the roller away from the said track, and cam means for adjusting the said tie-down bracket toward and away from the track to effect a nicety of engagement between the roller and the track.

2. In a seat adjuster adapted for an automotive vehicle of the type having a track and a roller upon the said track, a shaft for the said roller, a tie-down bracket mounted upon the said shaft and slidably engaging the said track, a cam member mounted eccentrically and rotatably upon the said shaft and supporting the said tie-down bracket whereby the said cam member can be rotated to adjust the said tie-down member toward and away from the said track, and means locking the said cam member in its adjusted position.

3. In a seat adjuster adapted for an automotive vehicle seat of the type having a track and a roller adapted to roll upon the track, a shaft supporting the said roller, an eccentric cam rotatably mounted on the said shaft, a tie-down bracket carried by the said cam and having a portion slidably engaging the underside of the said track whereby the cam member may be rotated to adjust the tie-down bracket toward and away from the said track to effect a nicety of engagement and prevent movement of the roller away from the said track, and means for locking the said cam in fixed relation to the said bracket.

4. A seat adjusting mechanism comprising a pair of spaced track members, a pair of spaced bracket members, a shaft rotatably carried by the said bracket members and extending transversely across the seat bottom from one bracket to the other, a pair of rollers carried by the said shaft in rolling relation with the said track members, the said track members each having an overhanging flange, and a pair of tie-down brackets carried solely by the said shaft in spaced relation, each tie-down bracket having a flange portion in operative engagement with the underside of the overhanging flange of a track member for maintaining the rollers in rolling relation with the track members, and means for adjusting the flanges of the tie-down bracket and track member toward and away from each other.

EMORY GLENN SIMPSON.
ANDREW C. ANDERSEN.
SHERROD E. SKINNER.